(12) United States Patent
Liu et al.

(10) Patent No.: US 10,583,580 B2
(45) Date of Patent: Mar. 10, 2020

(54) SAND AERATED CONCRETE PANEL EMBEDDED WITH WIRE BOX AND WIRE CONDUIT AND METHOD FOR PREPARING SAME

(71) Applicant: Shaanxi Nitya New Materials Technology Co., Ltd., Xi'an, Shaanxi (CN)

(72) Inventors: Yang Liu, Shaanxi (CN); Junqi Li, Shaanxi (CN); Zhenfeng Liu, Shaanxi (CN); Xiaoyu Xue, Shaanxi (CN); Tao Liu, Shaanxi (CN); Yuan Zhou, Shaanxi (CN); Ping Yang, Shaanxi (CN)

(73) Assignee: Shaanxi Nitya New Materials Technology Co., Ltd., Xi'an (CN)

( * ) Notice: Subject to any disclaimer, the term of this patent is extended or adjusted under 35 U.S.C. 154(b) by 0 days.

(21) Appl. No.: 16/159,277

(22) Filed: Oct. 12, 2018

(65) Prior Publication Data
US 2019/0184602 A1    Jun. 20, 2019

(51) Int. Cl.
| | | |
|---|---|---|
| E04C 2/52 | (2006.01) |
| E04C 2/04 | (2006.01) |
| B28B 23/02 | (2006.01) |
| B28B 11/24 | (2006.01) |
| C04B 28/02 | (2006.01) |
| E04C 2/06 | (2006.01) |
| B28B 7/34 | (2006.01) |

(Continued)

(52) U.S. Cl.
CPC ............ *B28B 23/022* (2013.01); *B28B 7/342* (2013.01); *B28B 11/245* (2013.01); *C04B 28/02* (2013.01); *C04B 28/18* (2013.01); *E04C 2/044* (2013.01); *E04C 2/049* (2013.01); *E04C 2/06* (2013.01); *E04C 2/52* (2013.01); *C04B 28/10* (2013.01); *C04B 38/02* (2013.01)

(58) Field of Classification Search
CPC ..... B28B 23/022; B28B 7/342; B28B 11/245; E04C 2/044; E04C 2/52
See application file for complete search history.

(56) References Cited

U.S. PATENT DOCUMENTS

| | | | | |
|---|---|---|---|---|
| 4,259,824 A * | 4/1981 | Lopez | ..................... | B28B 1/087 |
| | | | | 106/711 |
| 6,494,008 B1 * | 12/2002 | Bloem | .................. | E01F 8/0017 |
| | | | | 181/210 |

(Continued)

*Primary Examiner* — Paola Agudelo
(74) *Attorney, Agent, or Firm* — Wayne & Ken, LLC; Tony Hom

(57) ABSTRACT

Disclosed is a sand aerated concrete panel pre-embedded with a wire box and a wire conduit and its preparation method. The concrete panel includes a sand aerated concrete panel, a steel bar mesh cage, a wire box and a wire conduit. The steel bar mesh cage includes a plurality of longitudinal main steel bars, a plurality of transverse auxiliary steel bars and a plurality of connecting iron pieces; the wire box and the wire conduit are fixed on the steel bar mesh cage; and the steel bar mesh cage, the wire box and the wire conduit are poured in the sand aerated concrete panel. The disclosure solves the problems of complicated procedures, high cost, environmental pollution caused by dust and noise in the prior art, avoids the potential quality hazards of the panels and wall structures caused by on-site slotting, reduces labor force, intensity and cost.

7 Claims, 3 Drawing Sheets

(51) Int. Cl.
*C04B 28/18* (2006.01)
*C04B 38/02* (2006.01)
*C04B 28/10* (2006.01)

(56) References Cited

U.S. PATENT DOCUMENTS

| | | | |
|---|---|---|---|
| 6,698,150 B1* | 3/2004 | DiLorenzo | E01F 8/0029 52/250 |
| 10,132,072 B2* | 11/2018 | Sinai | E04B 1/02 |
| 2006/0230706 A1* | 10/2006 | Skendzic | E04B 1/04 52/794.1 |
| 2010/0107536 A1* | 5/2010 | Tautari | B28B 7/0032 52/414 |
| 2011/0023410 A1* | 2/2011 | Hernandez Gallardo | E04C 2/044 52/794.1 |
| 2012/0180411 A1* | 7/2012 | Trimmer | E04C 2/044 52/220.1 |
| 2014/0272216 A1* | 9/2014 | Deo | C04B 38/02 428/34.5 |
| 2015/0068146 A1* | 3/2015 | Dixon | E04B 2/10 52/425 |
| 2017/0342726 A1* | 11/2017 | Yu | E04B 1/86 |
| 2018/0112389 A1* | 4/2018 | Lake | E04B 1/16 |
| 2018/0281346 A1* | 10/2018 | Widjaja | B32B 7/14 |
| 2019/0093348 A1* | 3/2019 | Robak | E04B 2/8652 |

* cited by examiner

SAND AERATED CONCRETE PANEL EMBEDDED WITH WIRE BOX AND WIRE CONDUIT AND METHOD FOR PREPARING SAME

CROSS-REFERENCE TO RELATED APPLICATIONS

This application claims to Chinese Application No. 201711338319.5 with a filing date of Dec. 14, 2017. The content of the aforementioned applications, including any intervening amendments thereto, are incorporated herein by reference.

TECHNICAL FIELD

The disclosure relates to a green and environment-friendly assembling-type new building material, and more particularly to a sand aerated concrete panel pre-embedded with a wire box and a wire conduit and a method for preparing the same.

BACKGROUND

At present, all the building walls installed with sand aerated concrete panels are manually cut or drilled with a cutting machine or a drilling machine to make wire slots and socket holes, and then a wire box and a wire conduit are installed. Disadvantages of the prior art are as follows:
(1) slotting with the cutting machine or the drilling machine can easily damage the steel bars of the panel, causing structural damage to the wall;
(2) vibration generated during slotting with the cutting machine or the drilling machine can easily cause cracks in the panel;
(3) the manual slotting process is tedious with a long construction period and high cost; and
(4) on-site slotting produces lots of dust, noise and environmental pollution.

The traditional autoclaved sand aerated concrete panel requires manual use of the cutting machine or the drilling machine to slot and then manual installation of the wire box and the wire conduit, which not only easily damages the panel body and causes damage to the wall structure, but also has complicated procedures, prolonged construction period and high labor cost. On-site slotting will cause serious environmental pollution and harm to human health. Therefore, we propose an autoclaved sand aerated concrete panel pre-embedded with a wire box and a wire conduit.

SUMMARY

In order to solve the above problems, the disclosure provides a sand aerated concrete panel pre-embedded with a wire box and a wire conduit and a method for preparing the same, which effectively make up the forgoing deficiencies and defects of the prior art, and overcome the problems of damage to the wall caused by manual slotting, complicated procedures, long construction period, high cost, much dust, large noise, environmental pollution and the like.

The above object of the present disclosure is achieved by the following technical solution:

The disclosure provides a sand aerated concrete panel pre-embedded with a wire box and a wire conduit and a method for preparing the same, including a sand aerated concrete panel, a steel bar mesh cage, a wire box and a wire conduit; where the steel bar mesh cage includes a plurality of longitudinal main steel bars, a plurality of transverse auxiliary steel bars and a plurality of connecting iron pieces; the wire box and the wire conduit are fixed on the steel bar mesh cage, inside of the wire box and ends of the wire conduit are filled with polystyrene boards and then sealed with a transparent adhesive tape; and the steel bar mesh cage, the wire box and the wire conduit are poured in the sand aerated concrete panel.

Preferably, the wire box and the wire conduit are poured in the sand aerated concrete panel, and an upper surface of the wire box is parallel to a large surface of the sand aerated concrete panel.

Preferably, the wire box and the wire conduit are made of galvanized iron.

Preferably, the wire box and the wire conduit are fixed with the steel bar mesh cage by welding, binding or bonding with an embedded steel bar adhesive.

Preferably, the plurality of longitudinal main steel bars are fixed at equal intervals, and the transverse auxiliary steel bars are fixed at equal intervals in the middle and at unequal intervals on both sides.

Preferably, components of the sand aerated concrete panel include quartz sand, lime, cement, gypsum, aluminum powder and a foam stabilizer, where contents of the components in percentage by weight are: 53%~60% of the quartz sand, 8%~13% of the lime, 20%~30% of the cement, 2%~4% of the gypsum, 0.6‰~0.7‰ of the aluminum powder and 0.02‰~0.03‰ of the foam stabilizer.

The disclosure also relates to a method for preparing the sand aerated concrete panel pre-embedded with the wire box and the wire conduit as described above, which is characterized by including the following steps:
(1) proportionally dosing components according to the contents in percentage by weight: 53%~60% of the quartz sand, 8%~13% of the lime, 20%~30% of the cement, 2%~4% of the gypsum, 0.6‰~0.7‰ of the aluminum powder and 0.02‰~0.03‰ of the foam stabilizer; and preparing the steel bar mesh cage, the wire box and the wire conduit;
(2) raw material processing: wet grinding the quartz sand into quartz sand slurry, adding water into the gypsum to make gypsum slurry, straightening and cutting steel bars, and welding into steel bar mesh sheets according to the requirements of design drawings, and making the steel bar mesh sheets into the steel bar mesh cage through the connecting iron pieces;
(3) sealing with the transparent adhesive tape after filling the inside of the wire box and ends of the wire conduit with the polystyrene boards, so as to prevent slurry after pouring from entering the wire box and the wire conduit to cause blockage;
(4) fixing the wire box and the wire conduit with the steel bar mesh cage by welding, binding or bonding with the embedded steel bar adhesive;
(5) sequentially adding the quartz sand slurry, the gypsum slurry, the cement and the lime into a dosing and stirring tank according to the proportion in step (1) to be mixed and stirred to obtain a first mixture; at the same time, adding the aluminum powder and the foam stabilizer into an aluminum powder stirring tank to be mixed and stirred to obtain a second mixture, and then adding the second mixture into the first mixture to be stirred uniformly to obtain a sand aerated concrete slurry mixture;
(6) pouring the sand aerated concrete slurry mixture into a mould vehicle and inserting the steel bar mesh cage pre-installed with the wire box and the wire conduit, and then static placing the sand aerated concrete slurry mixture in a static placing room to obtain a green body; taking the green body out of the static placing room after reaching a drill steel pulling hardness for pulling a drill steel, and turning over and demoulding the green body for cutting;

(7) grouping the green body after cutting and autoclave curing in an autoclave, where the polystyrene boards and the transparent adhesive tape are melted after autoclave curing at a high temperature, and only residues of the polystyrene boards and the transparent adhesive tape need to be cleaned after knocking open the wire box and the ends of the wire conduit upon construction; and (8) taking the green body out of the autoclave after autoclave curing at the high temperature for severing panels, and marking pre-embedded positions of the wire box and the ends of the wire conduit to obtain the sand aerated concrete panel pre-embedded with the wire box and the wire conduit; knocking open the wire box and the ends of the wire conduit according to marks after assembling the sand aerated concrete panel pre-embedded with the wire box and the wire conduit upon construction; and installing a socket in the wire box after pre-embedded and wiring in the wire conduit.

Compared with the prior art, the present disclosure has the following advantages:

(1) the wire box and the wire conduit are well integrated with the panel, thus ensuring the structural performance of the panel;

(2) on-site slotting is not required, thus avoiding cracks in the panel formed due to vibration of secondary construction;

(3) on-site slotting is not required, thus leading to convenient construction, a saved labor cost, a shortened construction period and a reduced total construction cost of the project;

(4) on-site slotting is not required, so that no dust or noise is produced, thus protecting the environment against pollution.

Figure 1:
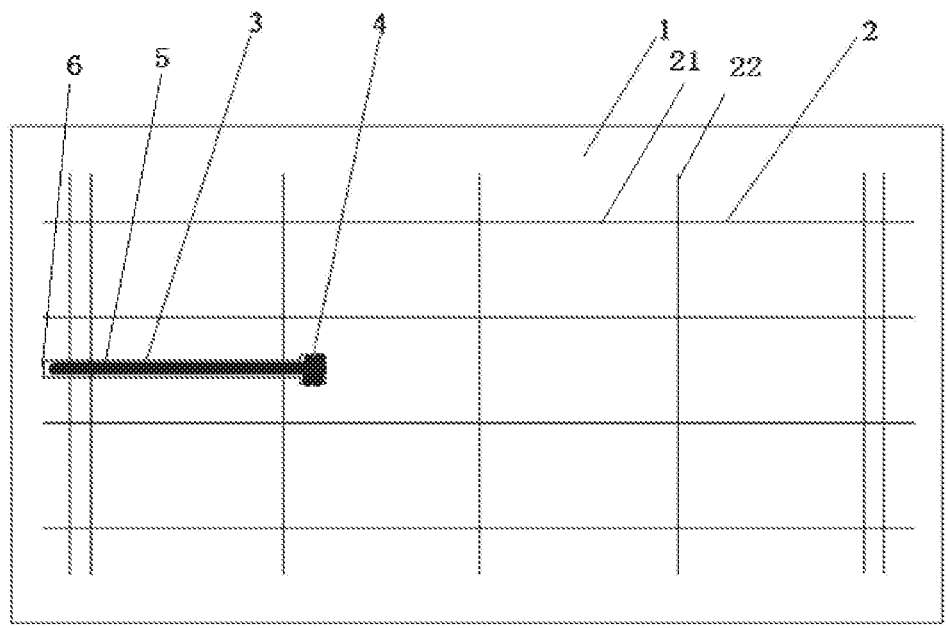
FIG. 1 is a schematic structural diagram of the present disclosure.
Figure 2:
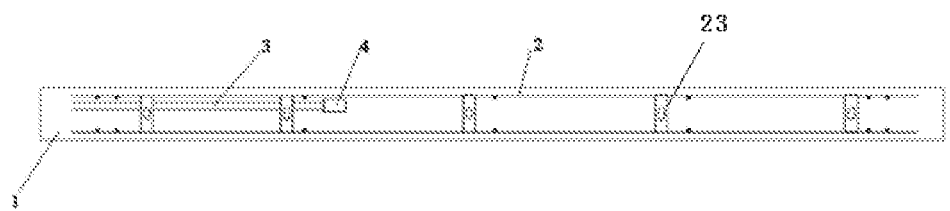
FIG. 2 is a schematic side sectional view of the present disclosure.
Figure 3:
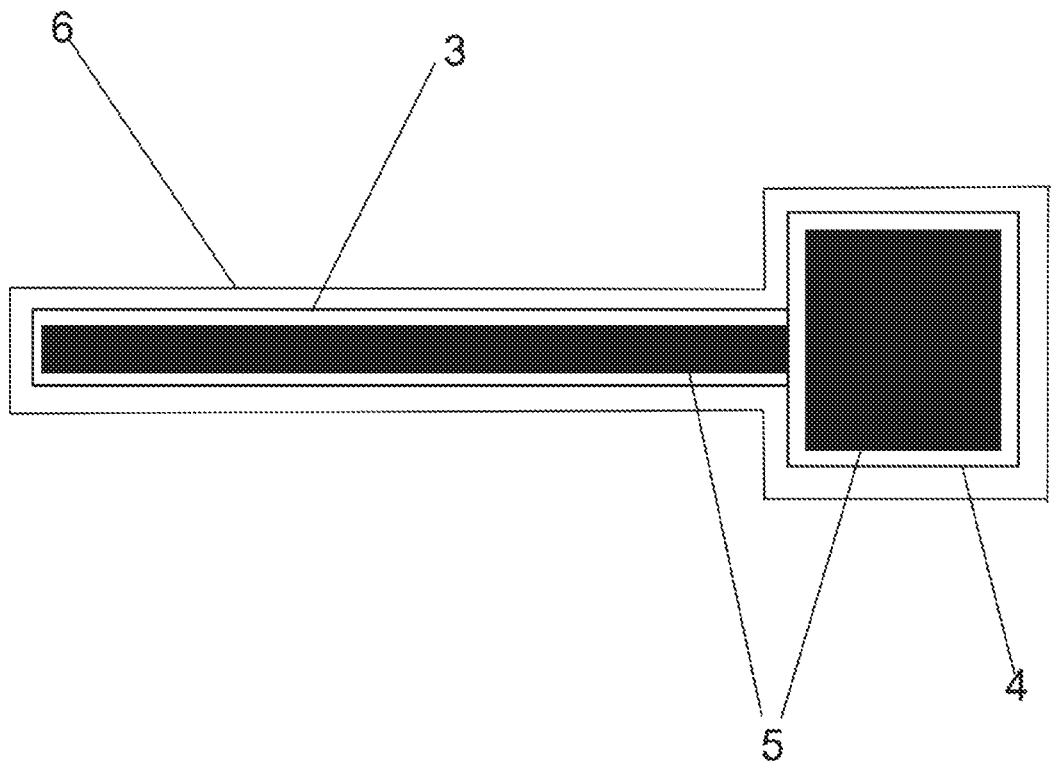
FIG. 3 is an enlarged schematic diagram of the wire box and the wire conduit, with polystyrene boards and transparent adhesive tapes.

Reference numeral: 1-sand aerated concrete panel, 2-steel bar mesh cage, 21-longitudinal main steel bar, 22-transverse auxiliary steel bar, 23-connecting iron piece, 3-wire conduit, 4-wire box, 5-polystyrene board, 6-transparent adhesive tape.

Detailed Description

Specific embodiments of the present disclosure will now be described with reference to the accompanying drawings.

It shall be noted that the structure, proportion, size, etc., illustrated in the drawings in this specification are only used to match with the contents disclosed in this specification for understanding and reading by those skilled in the art, and are not intended to limit the conditions under which the present disclosure can be implemented. Any modification of the structure, change of proportion or adjustment of the size shall still fall within the scope covered by the technical contents disclosed in this disclosure without affecting the efficacy and purpose that the present disclosure can achieve.

At the same time, the terms such as "upper", "lower", "left", "right", "middle" and "one" cited in this specification are only for convenience of description, and are not intended to limit the scope of the disclosure, and changes or adjustments in their relative relationships are also considered as falling within the scope of the disclosure without substantially changing the technical contents.

The disclosure provides a sand aerated concrete panel pre-embedded with a wire box and a wire conduit, including a sand aerated concrete panel 1, a steel bar mesh cage 2, a wire box 4 and a wire conduit 3. The steel bar mesh cage 2 includes a plurality of longitudinal main steel bars 21, a plurality of transverse auxiliary steel bars 22 and a plurality of connecting iron pieces 23. The plurality of longitudinal main steel bars 21 and the plurality of transverse auxiliary steel bars 22 are fixed to form steel bar mesh sheets. Two steel bar mesh sheets are connected by the plurality of the connecting iron pieces 23 to form the steel bar mesh cage 2. The wire box 4 and the wire conduit 3 are fixed on the steel bar mesh cage 2, inside of the wire box 4 and ends of the wire conduit 3 are filled with polystyrene boards and then sealed with a transparent adhesive tape 6. The steel bar mesh cage 2, the wire box 4 and the wire conduit 3 are poured in the sand aerated concrete panel 1.

Preferably, the wire box 4 and the wire conduit 3 are poured in the sand aerated concrete panel 1, and an upper surface of the wire box 4 is parallel to a large surface of the sand aerated concrete panel 1. The upper surface of the wire box 4 is a surface which is finally knocked open to install a socket, and the large surface of the sand aerated concrete panel 1 is a wall surface of a building.

Preferably, the wire box 4 and the wire conduit 3 are made of galvanized iron.

Preferably, the wire box 4 and the wire conduit 3 are fixed with the steel bar mesh cage 2 by welding, binding or bonding with an embedded steel bar adhesive.

Preferably, the plurality of longitudinal main steel bars 21 are fixed at equal intervals, and the transverse auxiliary steel bars 22 are fixed at equal intervals in the middle and at unequal intervals on both sides.

Preferably, components of the sand aerated concrete panel include quartz sand, lime, cement, gypsum, aluminum powder and a foam stabilizer, where contents of the components in percentage by weight are: 53%~60% of the quartz sand, 8%~13% of the lime, 20%~30% of the cement, 2%~4% of the gypsum, 0.6‰~0.7‰ of the aluminum powder and 0.02‰~0.03‰ of the foam stabilizer.

The disclosure also relates to a method for preparing the sand aerated concrete panel pre-embedded with the wire box and the wire conduit as described above, which is characterized by including the following steps:

(1) proportionally dosing components according to the contents in percentage by weight: 53%~60% of the quartz sand, 8%~13% of the lime, 20%~30% of the cement, 2~4% of the gypsum, 0.6‰~0.7‰ of the aluminum powder and 0.02‰~0.03‰ of the foam stabilizer; and preparing the steel bar mesh cage, the wire box and the wire conduit;

(2) raw material processing: wet grinding the quartz sand into quartz sand slurry, adding water into the gypsum to make gypsum slurry, straightening and cutting steel bars, and welding into the steel bar mesh sheets according to the requirements of design drawings, and making the steel bar mesh sheets into the steel bar mesh cage through the connecting iron pieces;

(3) sealing with the transparent adhesive tape after filling the inside of the wire box and ends of the wire conduit with the polystyrene boards, so as to prevent slurry after pouring from entering the wire box and the wire conduit to cause blockage;

(4) fixing the wire box and the wire conduit with the steel bar mesh cage by welding, binding or bonding with the embedded steel bar adhesive;

(5) sequentially adding the quartz sand slurry, the gypsum slurry, the cement and the lime into a dosing and stirring tank according to the proportion in step (1) to be mixed and stirred to obtain a first mixture; at the same time, adding the aluminum powder and the foam stabilizer into an aluminum powder stirring tank to be mixed and stirred to obtain a second mixture, and then adding the second mixture into the first mixture to be stirred uniformly to obtain a sand aerated concrete slurry mixture;

(6) pouring the sand aerated concrete slurry mixture into a mould vehicle and inserting the steel bar mesh cage pre-installed with the wire box and the wire conduit, and then static placing the sand aerated concrete slurry mixture in a static placing room to obtain a green body; taking the green body out of the static placing room after reaching a drill steel pulling hardness for pulling a drill steel, and turning over and demoulding the green body for cutting:

(7) grouping the green body after cutting and autoclave curing in an autoclave, where the polystyrene boards and the transparent adhesive tape are melted after autoclave curing at a high temperature, and only residues of the polystyrene boards and the transparent adhesive tape need to be cleaned after knocking open the wire box and the ends of the wire conduit upon construction; and (8) taking the green body out of the autoclave after autoclave curing at high temperature for severing panels, and marking pre-embedded positions of the wire box and the ends of the wire conduit to obtain the sand aerated concrete panel pre-embedded with the wire box and the wire conduit; knocking open the wire box and the ends of the wire conduit according to marks after assembling the sand aerated concrete panel pre-embedded with the wire box and the wire conduit upon construction; and installing a socket in the wire box after pre-embedded and wiring in the wire conduit.

Compared with the current method of on-site slotting with a cutting machine or a drilling machine, the disclosure solves the problems of complicated procedures, high cost, environmental pollution caused by dust and noise in the prior art, avoids potential quality hazards of the panels and wall structures caused by on-site slotting, greatly reduces labor force, labor intensity and labor cost, and has remarkable economic and social benefits.

According to the disclosure, the wire box and the wire conduit are well integrated with the panel, thus ensuring the structural performance of the panel. No on-site slotting is required, thus preventing man-made cracks from being formed in the panel due to vibration of secondary construction. No on-site slotting is required, thus leading to convenient construction, a saved labor cost, a shortened construction period and a reduced total construction cost of the project, and protecting the environment against pollution.

The preferred embodiments of the present disclosure have been described in detail above with reference to the accompanying drawings, but the present disclosure is not limited thereto, and various changes can be made within the knowledge of those skilled in the art without departing from the spirit of the present disclosure.

Many other variations and modifications may be made without departing from the concept and scope of the present disclosure. It should be understood that the present disclosure is not limited to specific embodiments, and the scope of the present disclosure is defined by the appended claims.

What is claimed is:

1. A sand aerated concrete panel pre-embedded with a wire box and a wire conduit, comprising a sand aerated concrete panel, a steel bar mesh cage, a wire box and a wire conduit, wherein the steel bar mesh cage comprises a plurality of longitudinal main steel bars, a plurality of transverse auxiliary steel bars and a plurality of connecting iron pieces; the wire box and the wire conduit are fixed on the steel bar mesh cage; inside of the wire box and the wire conduit are filled with polystyrene boards; wherein the wire box and the wire conduit are sealed with a transparent adhesive tape; and the steel bar mesh cage, the wire box and the wire conduit are positioned in the sand aerated concrete panel.

2. The sand aerated concrete panel pre-embedded with the wire box and the wire conduit according to claim 1, wherein the wire box and the wire conduit are positioned in the sand aerated concrete panel; and an upper surface of the wire box is parallel to a large surface of the sand aerated concrete panel.

3. The sand aerated concrete panel pre-embedded with the wire box and the wire conduit according to claim 1, wherein the wire box and the wire conduit are made of galvanized iron.

4. The sand aerated concrete panel pre-embedded with the wire box and the wire conduit according to claim 1, wherein the wire box and the wire conduit are fixed with the steel bar mesh cage by welding, binding or bonding with an embedded steel bar adhesive.

5. The sand aerated concrete panel pre-embedded with the wire box and the wire conduit according to claim 1, wherein the plurality of longitudinal main steel bars are fixed at equal intervals; and the transverse auxiliary steel bars are fixed at equal intervals in the middle and at unequal intervals on both sides.

6. The sand aerated concrete panel pre-embedded with the wire box and the wire conduit according to claim 1, wherein components of the sand aerated concrete panel comprise quartz sand, lime, cement, gypsum, aluminum powder and a foam stabilizer; and contents of the components in percentage by weight are: 53%~60% of the quartz sand, 8%~13% of the lime, 20%~30% of the cement, 2%~4% of the gypsum, 0.6‰~0.7‰ of the aluminum powder and 0.02‰~0.03‰ of the foam stabilizer.

7. A method for preparing the sand aerated concrete panel pre-embedded with the wire box and the wire conduit according to claim 1, comprising the following steps:
(1) proportionally dosing the components according to the contents in percentage by weight: 53%~60% of the quartz sand, 8%~13% of the lime, 20%~30% of the cement, 2%~4% of the gypsum, 0.6‰~0.7‰ of the aluminum powder and 0.02‰~0.03‰ of the foam stabilizer; and preparing the steel bar mesh cage, the wire box and the wire conduit;
(2) raw material processing: wet grinding the quartz sand into quartz sand slurry, adding water into the gypsum to make gypsum slurry, straightening and cutting steel bars, and then welding the steel bars into steel bar mesh sheets according to the requirements of design drawings, and making the steel bar mesh sheets into the steel bar mesh cage through the connecting iron pieces;
(3) sealing with the transparent adhesive tape after filling the inside of the wire box and ends of the wire conduit with the polystyrene boards, so as to prevent slurry after pouring from entering the wire box and the wire conduit to cause blockage;

(4) fixing the wire box and the wire conduit with the steel bar mesh cage by welding, binding or bonding with the embedded steel bar adhesive;

(5) sequentially adding the quartz sand slurry, the gypsum slurry, the cement and the lime into a dosing and stirring tank according to the proportion in step (1) to be mixed and stirred to obtain a first mixture; at the same time, adding the aluminum powder and the foam stabilizer into an aluminum powder stirring tank to be mixed and stirred to obtain a second mixture, and then adding the second mixture into the first mixture to be stirred uniformly to obtain a sand aerated concrete slurry mixture;

(6) pouring the sand aerated concrete slurry mixture into a mould vehicle and inserting the steel bar mesh cage pre-installed with the wire box and the wire conduit, and then static placing the sand aerated concrete slurry mixture in a static placing room to obtain a green body; taking the green body out of the static placing room for pulling a drill steel after reaching a drill steel pulling hardness, and turning over and demoulding the green body for cutting;

(7) grouping the green body after cutting and autoclave curing in an autoclave, the polystyrene boards and the transparent adhesive tape being melted after autoclave curing at a high temperature, and cleaning residues of the polystyrene boards and the transparent adhesive tape after knocking open the wire box and the ends of the wire conduit upon construction; and (8) taking the green body out of the autoclave after autoclave curing at the high temperature for severing panel, and marking pre-embedded positions of the wire box and the ends of the wire conduit to obtain the sand aerated concrete panel pre-embedded with the wire box and the wire conduit; knocking open the pre-embedded positions of the wire box and the ends of the wire conduit according to marks after assembling the sand aerated concrete panel pre-embedded with the wire box and the wire conduit upon construction; and installing a socket in the wire box after pre-embedded and wiring in the wire conduit.

\* \* \* \* \*